United States Patent
Kuo

(10) Patent No.: US 6,189,769 B1
(45) Date of Patent: Feb. 20, 2001

(54) METHOD OF CABLE WIRE ARRANGEMENT

(75) Inventor: Peter Kuo, Chung-Ho (TW)

(73) Assignee: Hon Hai Precision Ind. Co., Ltd., Taipei Hsien (TW)

( * ) Notice: Under 35 U.S.C. 154(b), the term of this patent shall be extended for 0 days.

(21) Appl. No.: 09/397,154

(22) Filed: Sep. 15, 1999

(30) Foreign Application Priority Data

Dec. 11, 1998 (TW) ................................. 87120616

(51) Int. Cl.⁷ ............................ B23K 31/02; H01R 43/02
(52) U.S. Cl. ............................ 228/205; 29/860; 29/878; 439/580
(58) Field of Search ................................. 228/205, 160; 29/860, 878; 439/497, 580

(56) References Cited

U.S. PATENT DOCUMENTS

| | | | |
|---|---|---|---|
| 3,999,273 | * 12/1976 | Leaf et al. | 29/203 DT |
| 4,424,403 | * 1/1984 | Bogese, II | 174/36 |
| 4,563,050 | * 1/1986 | Greenwood et al. | 339/99 R |
| 4,630,353 | * 12/1986 | Okazaki et al. | 29/564.4 |
| 4,781,620 | * 11/1988 | Tengler et al. | 439/497 |
| 4,856,187 | * 8/1989 | Blaha | 29/867 |
| 4,920,642 | * 5/1990 | Yanai | 29/860 |
| 5,032,703 | * 7/1991 | Henschen et al. | 219/85.22 |
| 5,051,870 | * 9/1991 | Companion | 361/405 |
| 5,190,473 | * 3/1993 | Mroczkowski et al. | 439/580 |
| 5,357,074 | * 10/1994 | Pawlikowski | 219/85.18 |
| 5,358,426 | * 10/1994 | Henschen et al. | 439/497 |
| 5,475,921 | * 12/1995 | Johnston | 29/878 |
| 5,806,179 | * 9/1998 | Hassanzadeh | 29/860 |
| 5,996,224 | * 12/1999 | Sullivan | 29/863 |
| 6,017,238 | * 1/2000 | Johnston | 439/404 |

\* cited by examiner

Primary Examiner—Patrick Ryan
Assistant Examiner—L. Edmondson
(74) Attorney, Agent, or Firm—Wei Te Chung

(57) ABSTRACT

The invention discloses a method of arranging a plurality of wires of a cable at proper positions for soldering to corresponding terminals of a connector. An arrangement for preparing wires of a cable suitable for subsequent soldering to terminals of an electrical connector has a soldering head including a pair of bases and a pair of heating plates. The base has a plurality of slots for engaging with corresponding flanges of the heating plate. A plurality of equidistantly spaced receiving slots is formed in the heating plates for engaging with the corresponding wires of the cable. Thus, efficiency can be improved during mass production.

9 Claims, 7 Drawing Sheets

METHOD OF CABLE WIRE ARRANGEMENT

BACKGROUND OF THE INVENTION

The present invention relates to a method for arranging cable, and particularly to a method for soldering a plurality of wires of a cable to corresponding terminals of an electrical connector.

DESCRIPTION OF THE PRIOR ART

As the development of technology continues to advance, electrical devices are designed to have an increasing number of functions. Electrical signal transmission is generally conducted through a cable and corresponding electrical connector. Thus, arranging the cable with the electrical connector is an important consideration for designers. In a conventional design, the cable is manually cut a predetermined length. An insulative covering is removed then a plurality of wires exposed, each wire comprises an inner conduct which is to be soldered to corresponding terminal of the connector. However, the cable comprises a plurality of wires in no particular order whereby properly positioning each wire with respect to the corresponding terminals becomes complicated. Since the positioning is performed manually, this results in high manufacturing costs and low efficiency. Furthermore, quality can not be accurately controlled during the manufacturing process. Thus, there is a need to improve the conventional method of assembling a cable to a connector.

BRIEF SUMMARY OF THE INVENTION

A main object of the present invention is to provide a method for properly arranging a plurality of wires for soldering to corresponding terminals of an electrical connector.

Another object of the present invention is to provide a cable device for soldering a plurality of wires to corresponding terminals of a connector.

To fulfill the above-mentioned objects, a melting mold used for arranging cable wires comprises a first base, a second base and two heating plates. The first and second bases each define a pair of grooves for engaging with corresponding flanges formed on a rear face of the heating plates. A plurality of receiving slots is formed on a mating face of each heating plate for receiving the corresponding wires of the cable. Each receiving slot is separated from each other a certain distance which is equal to the distance between each terminal of a connector. The wires are positioned within individual receiving slots for contacting the corresponding terminals according to the different color codes of the insulative layers.

Other objects, advantages and novel features of the invention will become more apparent from the following detailed description when taken in conjunction with the accompanying drawings.

DETAILED DESCRIPTION OF THE INVENTION

Figure 1:
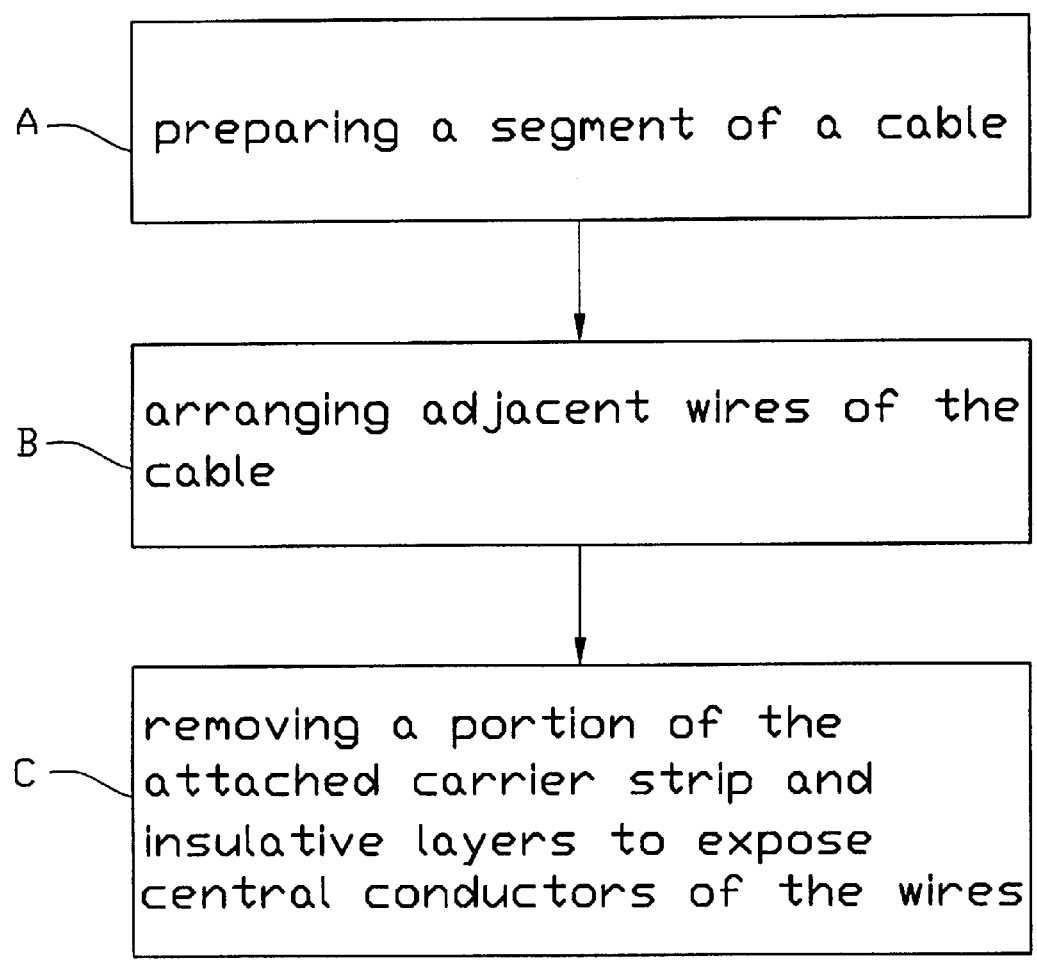
FIG. 1 is a flow chart showing manufacturing procedure steps for a method of arranging a cable in accordance with the invention.

Referring to FIGS. 1, 4, 7A and 8, the invention refers to a method for arranging a cable 1 to electrically engage with an electrical connector 4. The cable 1 comprises an insulative covering 11 and a plurality of wires 12. Each wire 12 has a central conductor 14 and an insulative layer 13. The connector 4 comprises a plurality of terminals 41 and an insulative housing 42 for receiving the terminals 41. The method comprises the steps as described in the following.

In the preparing step A, a segment of a cable 1 is cut a predetermine length and the insulative covering 11 is removed therefrom. Thus, the insulative layers 13 of the wires are exposed.

Figure 2:
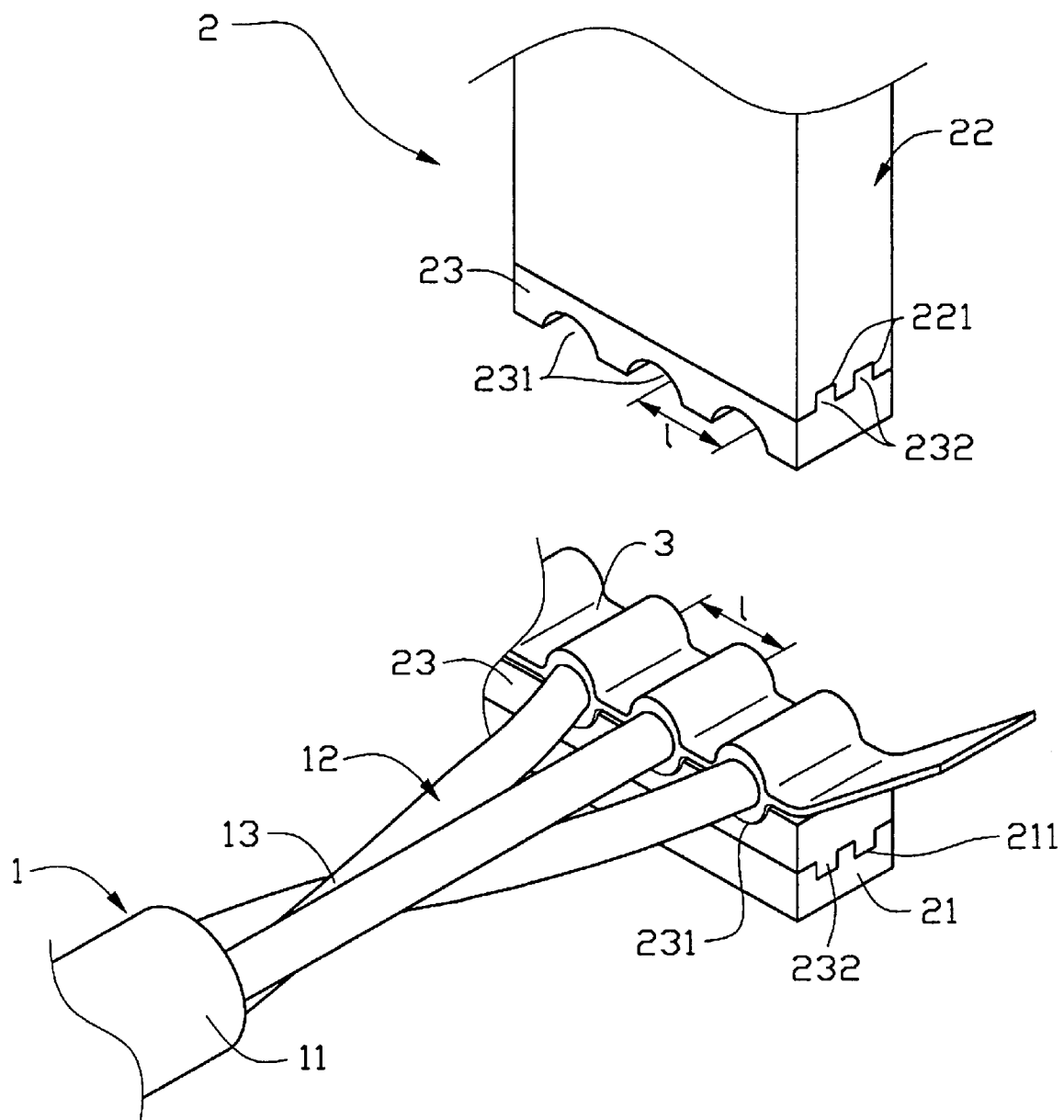
FIG. 2 is a perspective view of a cable device.
Figure 6:
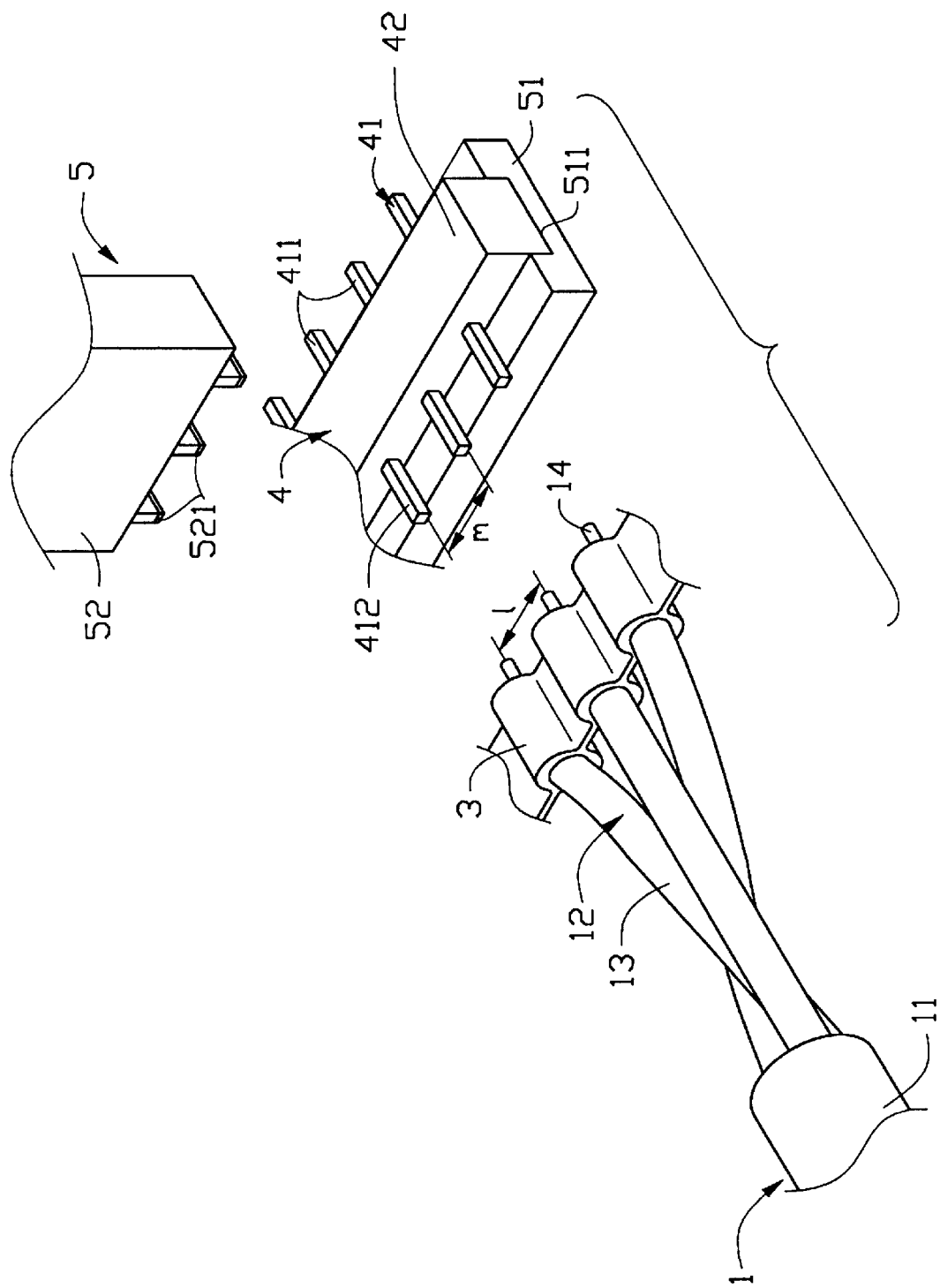
FIG. 6 is a perspective view of the cable device before being soldered to terminals of an electrical connector.

Referring to FIG. 2, a melting mold 2 comprises a first base 21, a second base 22 and two heating plates 23. The first and second bases 21, 22 each define a pair of grooves 211, 221 for engaging with corresponding flanges 232 formed on a rear face of the heating plates 23. A plurality of receiving slots 231 is formed on a mating face of each heating plate 23 for receiving the corresponding wires 12 of the cable 1. Each receiving slot 231 is separated from each other a certain distance. The receiving slots 231 are of different colors according to the respective terminals 41 and the insulative layers 13 of respective wires 12. which is equal to the distance m between each terminal 41 of the connector 4 (FIG. 6). In the arranging and melting step B, the wires 12 are positioned within individual receiving slots 231, on which a lower half of a melting carrier strip 3 is located, for contacting the corresponding terminals 41 according to the different color codes of the insulative layers 13.

Figure 3:
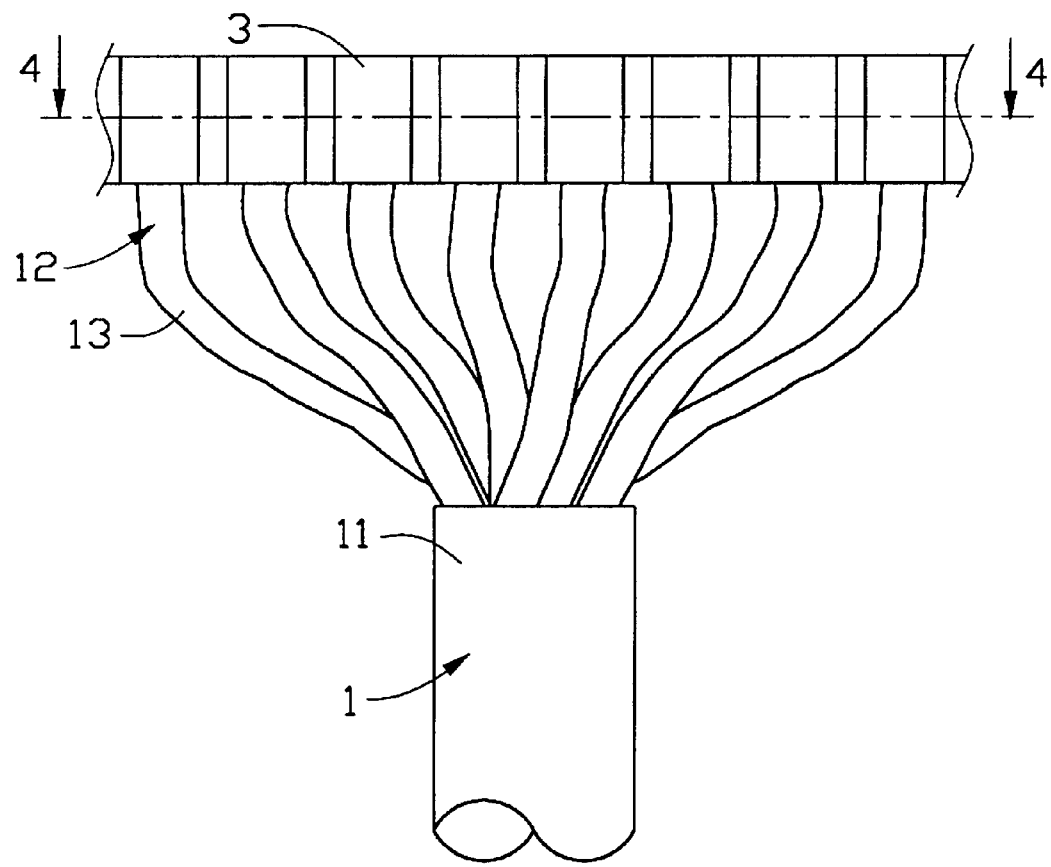
FIG. 3 is a top view of the cable device.
Figure 4:
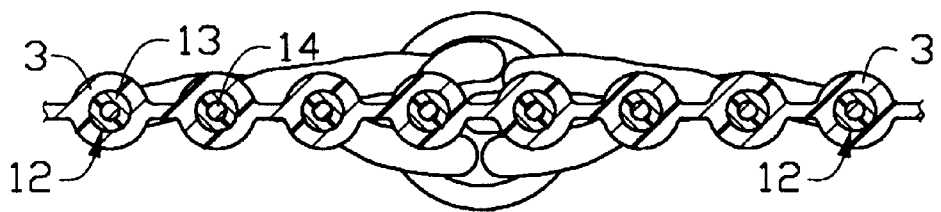
FIG. 4 is a cross-sectional view taken along line 4—4 of FIG. 3.
Figure 5:
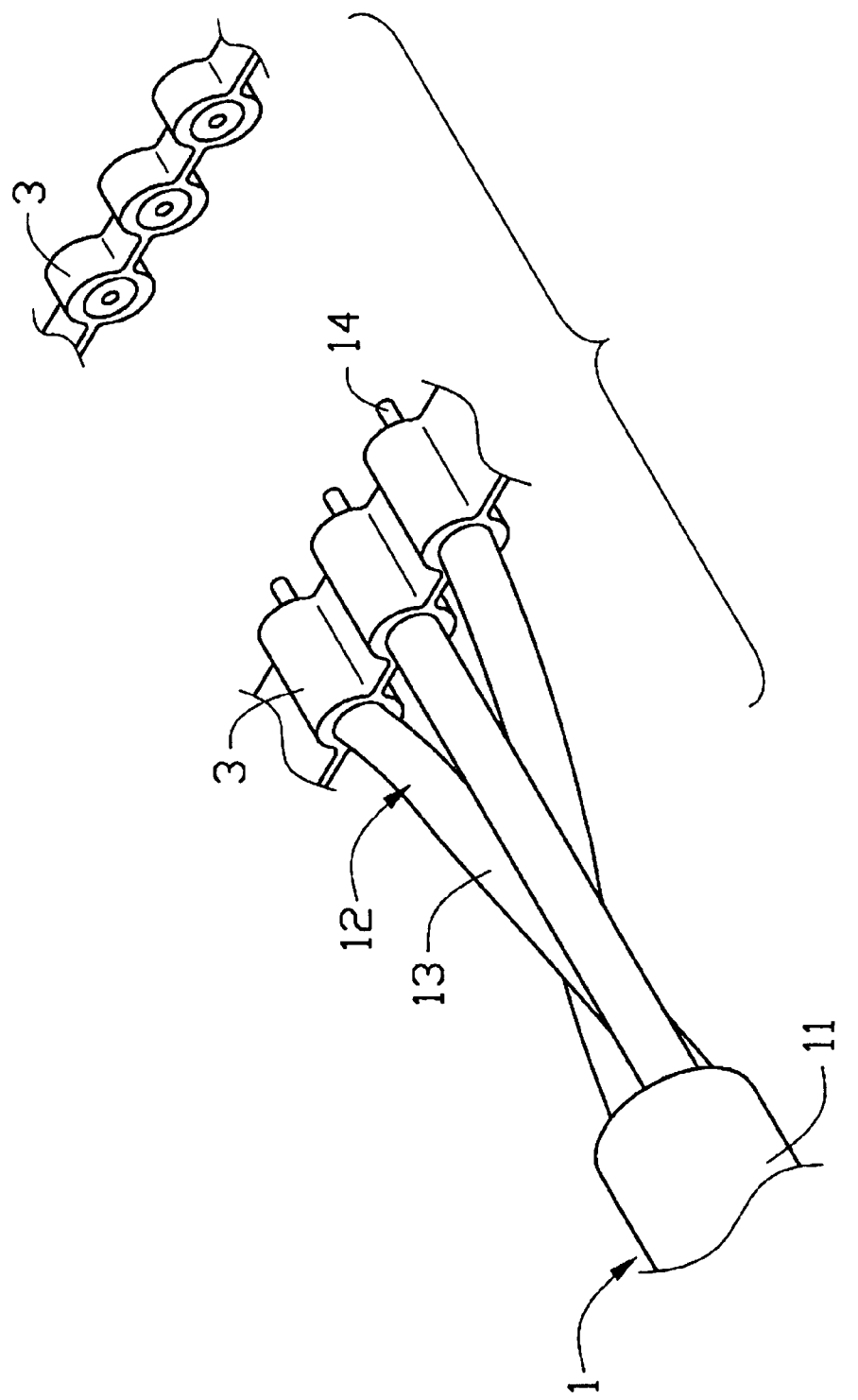
FIG. 5 is a perspective view of a cable after removing an insulative covering therefrom.

Also referring to FIGS. 3 and 4, the first and second bases 21, 22 of the melting mold 2 are each assembled with the heating plate 23, and each heating plate 23 acts as a positive pole and negative pole, respectively. An upper half of the melting carrier strip 3 cooperating with the lower half of the melting carrier strip 3. surrounds each wire 12 and the heating plate 23 is then heated to melt the insulative layer 13 such that the carrier strip 3 become an integral unit (as shown in FIGS. 2, 3, and 4). A semi-finished cable 1 (FIG. 5) is obtained after removing a portion of the attached carrier strip 3 and insulative layers 13 to expose central conductors 14 of the wires 12.

Referring to FIG. 6, a soldering device 5 comprises a soldering base 51 and a soldering head 52 with a slot 511 formed in a middle section of the soldering base 51 for receiving the insulative housing 42 of the connector 4 therein. Each terminal 41 of the connector 4 has an engaging section 412 and contacting section 411 extending along the soldering base 51. A plurality of soldering projections 521 is formed on the soldering head 52 for properly positioning the terminals 41 and the wires 12.

Figure 7A:
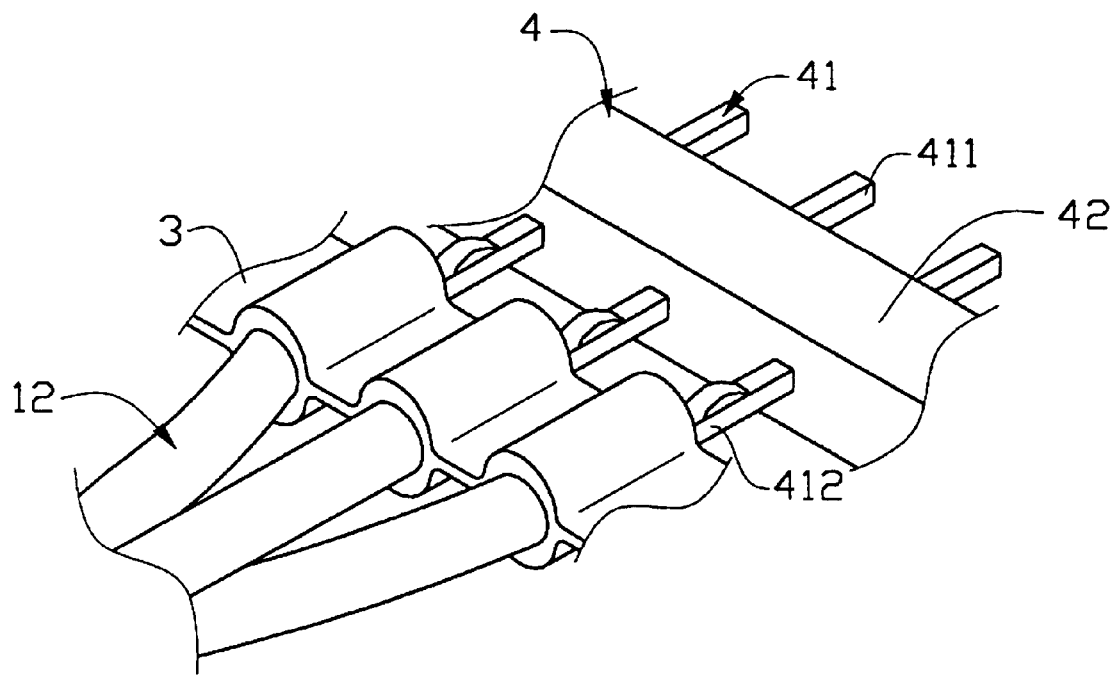
FIG. 7A is a perspective view of the cable device contacting the terminals of the connector after an engaging step is performed thereon.
Figure 7B:
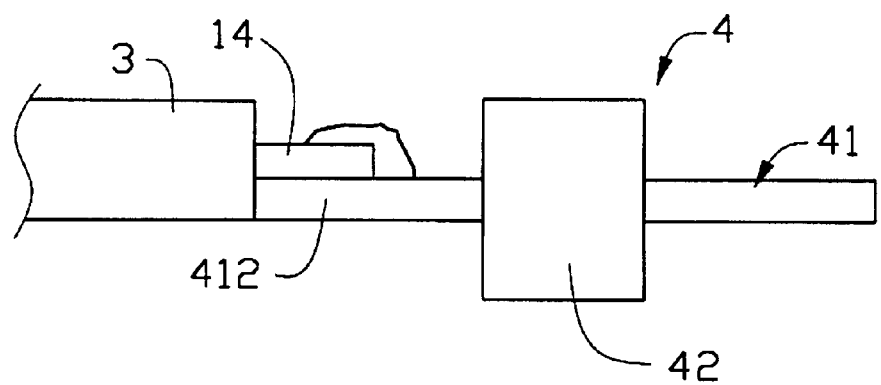
FIG. 7B is a side view of FIG. 7A.

Also referring to FIGS. 7A and 7B, in the engaging step C, the insulative housing 42 is mounted on the soldering base 51, and the carrier strip 3 is 15 positioned on the soldering base 51. The wires 12 of the cable 1 are thereby properly positioned corresponding to the terminals 41. The soldering process is achieved by engaging the soldering head 52 with the soldering base 51 whereby the soldering projections 521 electrically contact the corresponding wire 12 and central conductor 14 and engaging sections 412 of the terminals 41. Thus, the cable 1 is properly soldered to the electrical connector 4.

Figure 8:
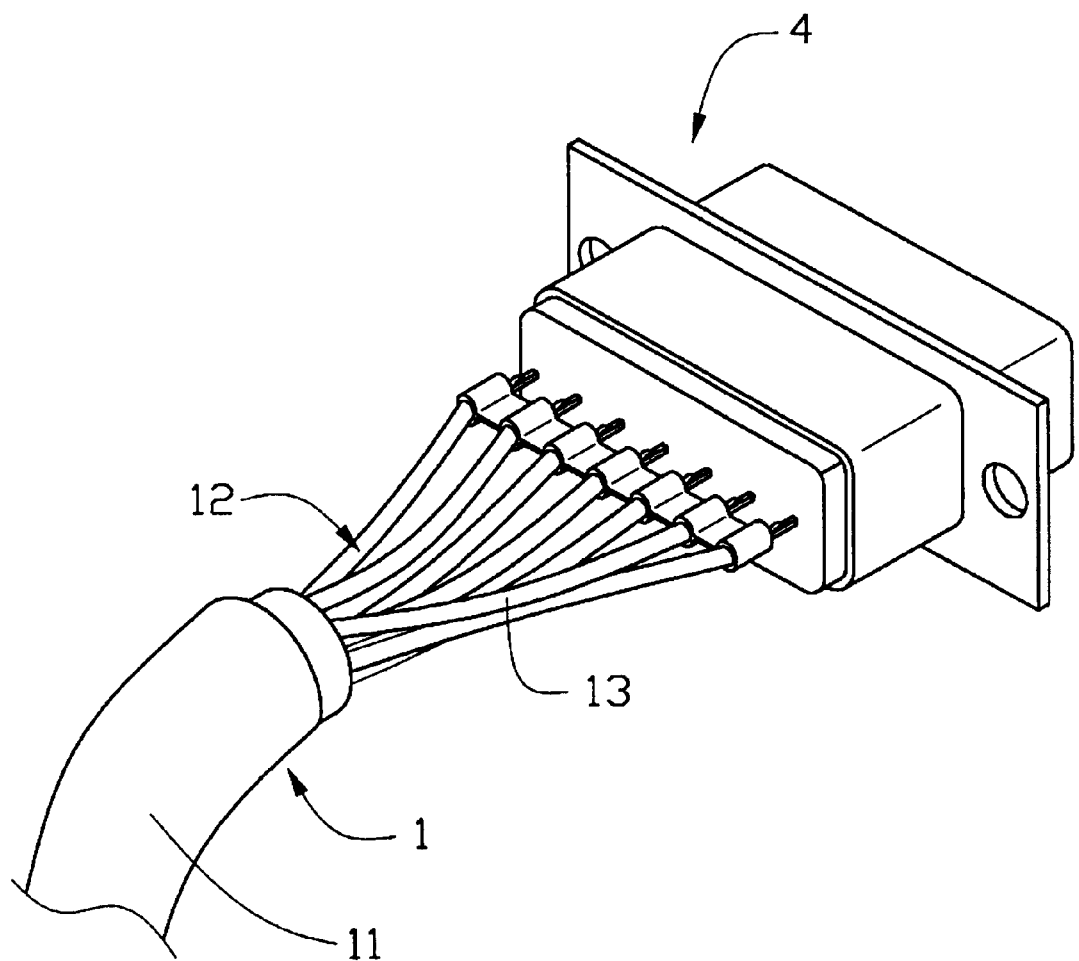
FIG. 8 is a perspective view of the cable device engaging with the connector.

Referring to FIG. 8, insulative material is molded to form a ouster cover (not shown) for surrounding the wires 12 of the cable 1 and a partial connector 4 thereby completing the manufacturing process.

After the arranging step, the wires 12 of the cable 1 are properly aligned with the corresponding terminals 41 and the insulative layers 13 are removed from the wires 12. Thus, manufacturing costs are reduced and efficiency is improved. Furthermore, product quality can be easily controlled during mass production.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for soldering a cable to a connector with terminals therein, said cable including a plurality of conductive wires bonded by an insulative covering, the method comprising the steps of:

removing a segment of insulative covering to expose the wires of the cable;

arranging equidistantly two adjacent wires;

attaching an insulative carrier strip onto the insulative layers of the spacedly arranged wires; and simultaneously removing a portion of the attached carrier strip and insulative layers to expose central conductors of the wires.

2. The method as claimed in claim 1, wherein the arranging step comprises positioning the wires in receiving slots of a heating plate.

3. The method as claimed in claim 1, wherein the carrier strip is made of same material as the insulative layer.

4. A method of arranging wires of a cable for facilitating subsequent engagement thereof with an electrical connector, the method comprising the steps of:

positioning wires of the cable in substantially equidistantly spaced receiving slots of a heating plate with a carrier strip surrounding respective insulative layer of each of the wires;

heating the carrier strip and the insulative layers to form an integral unit; and removing a portion of the integral unit to expose central conductors of the wires.

5. The method as claimed in claim 4, wherein the melting step comprises applying a pair of heating plates to opposite sides of the carrier strip.

6. An arrangement for preparing wires of a cable suitable for subsequent soldering to terminals of an electrical connector, comprising:

two bases each defining a pair of grooves; and a pair of heating plates each having a plurality of receiving slots formed on a mating face thereof for receiving corresponding wires therein and a pair of flanges formed on a rear face thereof for engaging with corresponding grooves, wherein the receiving slots are labeled with different colors in accordance with the order of the wires.

7. The arrangement as claimed in claim 6, wherein the receiving slots are labeled with different colors in accordance with the sequence of the corresponding terminals.

8. A method of simultaneously removing insulative layers of a plurality of wires, comprising steps of:

providing a plurality of wires equidistantly spaced from each other, each of said wires including an outer insulative layer and an inner conductor;

a carrier strip applied unto the insulative layers of the wires, and integrally binding and enclosing said wires as one piece; and cutting along said carrier strip and removing a portion of said carrier strip along with a portion of the insulative layer of each of said wires so as to expose the inner conductors of the corresponding wires around said cut carrier strip.

9. An arrangement of wires of a cable suitable for subsequent soldering to terminals of an electrical connector, comprising:

at least a wire, the wire having a central conductor surrounded with an insulative layer; and an insulative carrier strip integrally connected to the insulative layer of the wire by heating, the carrier strip being located at a free end of the wire, a predetermined length of the central conductor extending beyond the carrier strip.

* * * * *